United States Patent
Fortman et al.

(10) Patent No.: US 9,986,438 B2
(45) Date of Patent: May 29, 2018

(54) HIERARCHICAL SPECTRUM COORDINATION

(71) Applicant: Microsoft Technology Licensing, LLC, Redmond, WA (US)

(72) Inventors: Peter Fortman, Redmond, WA (US); Mark Clear, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/004,849

(22) Filed: Jan. 22, 2016

(65) Prior Publication Data

US 2017/0215079 A1    Jul. 27, 2017

(51) Int. Cl.
| | |
|---|---|
| *H04W 16/14* | (2009.01) |
| *H04L 5/00* | (2006.01) |
| *H04L 27/00* | (2006.01) |

(52) U.S. Cl.
CPC ............ *H04W 16/14* (2013.01); *H04L 5/003* (2013.01); *H04L 27/0006* (2013.01)

(58) Field of Classification Search
CPC ............ H04W 16/14; H04W 72/0453; H04W 72/082; H04W 24/02; H04W 72/04; H04W 28/18; H04W 16/10; H04W 72/048; H04W 28/16; H04W 72/0486; H04W 28/0231; H04W 52/343; H04W 72/00; H04W 72/0446
USPC ........................................................ 455/454
See application file for complete search history.

(56) References Cited

U.S. PATENT DOCUMENTS

| | | | |
|---|---|---|---|
| 5,982,969 | A | 11/1999 | Sugiyama et al. |
| 6,169,728 | B1 | 1/2001 | Perreault et al. |
| 7,184,777 | B2 | 2/2007 | Diener et al. |
| 7,408,907 | B2 | 8/2008 | Diener |
| 7,424,268 | B2 | 9/2008 | Diener et al. |
| 8,576,817 | B2 | 11/2013 | Stanforth et al. |
| 8,787,836 | B1 | 7/2014 | Carbajal |
| 2004/0028123 | A1 | 2/2004 | Sugar et al. |
| 2007/0032254 | A1 | 2/2007 | Chen |

(Continued)

FOREIGN PATENT DOCUMENTS

WO       2015047215 A1     4/2015

OTHER PUBLICATIONS

Yadav, et al., "A Survey on Dynamic Spectrum Access Techniques in Cognitive Radio", In International Journal of Next-Generation Networks, vol. 4, No. 4, Dec. 2012, pp. 27-46.

(Continued)

*Primary Examiner* — Kwasi Karikari (57) ABSTRACT

Examples disclosed herein relate to efficient hierarchical radio frequency (RF) spectrum assigning across both licensed and unlicensed frequencies in a given area. Wireless devices in the area are detected by a spectrum manager, which also detects all available RF frequencies that are available. Conditional, relative, or absolute RF assignment rules received by an administrator or from an administrative device dictate the allocation conditions for assigning wireless devices to different frequencies, channels, channel widths, bands, durations, or other specifics of the available RF frequencies. Alternatively, RF spectra may be assigned reactively based on the current, historical, or future network usage on the available network frequencies.

20 Claims, 5 Drawing Sheets

(56) References Cited

U.S. PATENT DOCUMENTS

| | | | |
|---|---|---|---|
| 2008/0222021 A1 | 9/2008 | Stanforth et al. | |
| 2011/0317742 A1* | 12/2011 | Kawahatsu | H04L 1/0003 |
| | | | 375/132 |
| 2012/0094681 A1 | 4/2012 | Freda et al. | |
| 2013/0023216 A1 | 1/2013 | Moscibroda et al. | |
| 2013/0275346 A1 | 10/2013 | Srikanteswara et al. | |
| 2014/0269375 A1 | 9/2014 | Garcia et al. | |
| 2016/0095129 A1* | 3/2016 | Hoyhtya | H04W 16/14 |
| | | | 370/330 |
| 2016/0249255 A1* | 8/2016 | Khawer | H04W 36/0005 |

OTHER PUBLICATIONS

"International Search Report and Written Opinion Issued in PCT Application No. PCT/US2017/013585", dated Apr. 26, 2017, 11 Pages.

Salami, et al., "A Comparison between the Centralized and Distributed Approaches for Spectrum Management", In Proceedings of the IEEE Communications Surveys & Tutorials, vol. 13, Issue 2, Apr. 1, 2011, pp. 274-290.

* cited by examiner

HIERARCHICAL SPECTRUM COORDINATION

BACKGROUND

All wireless technologies use the airwaves to transmit and receive information. To allow many different technologies to communicate simultaneously, wireless spectrum is carved up into chunks of frequency bands, with radio frequency (RF) in particular lying in the range of 3 kHz to 300 GHz. RF bands in a given area may be either licensed or unlicensed, and an enterprise may have access to both. For licensed bands, entities generally pay a fee—or otherwise obtain rights—for the exclusive rights to transmit on assigned channels of specific bands in a geographic region. In unlicensed bands, virtually anyone following particular transmission protocols may transmit data across the bands without having to pay licensing fees. Licensing is generally very impractical for certain device uses, such as for smaller wireless devices that yet remains available in most regions. However, the fact that virtually any device may transmit in unlicensed space causes interference and problems in areas with numerous wireless devices or during times of high network traffic. As wireless technologies become more prolific, enterprises—or groups of enterprises—need to manage multiple, sometimes contentious, wireless infrastructures within a given geographic area.

Wireless device traffic largely depends on the particular applications being performed on the devices in a given location. Streaming a video chat requires much more bandwidth than communicating e-mails. The frequencies an enterprise has licensed may quickly be consumed during peak hours, and services the enterprise has earmarked for the licensed frequencies may suffer interference or performance degradation if network capacity is not appropriately allocated to the wireless devices in the area.

Some enterprises have proprietary radio management solutions that manage devices within a single spectrum range. For example, wireless vendors sometimes have software that automatically assigns access points in a wireless infrastructure to different channels. Such solutions are very focused in scope to their own solution and devices. If an administrator deploys non-cooperating devices (e.g., wireless security cameras and wireless projection receivers), the two sets of devices may operate independently and unknowingly compete for the same airspace. The resultant interference may degrade the performance of groups of devices.

SUMMARY

The disclosed examples are described in detail below with reference to the accompanying drawing figures listed below. The below Summary is provided to illustrate some examples disclosed herein. It is not meant, however, to limit all examples to any particular configuration or sequence of operations.

Some examples disclosed herein are directed to efficiently managing available spectrum for cooperating and non-cooperating wireless devices in a given area using an intelligent spectrum manager. The spectrum manager detects the wireless devices in the area, either through intermediary network access devices providing network connectivity to wireless devices or directly from the wireless devices themselves. The network access devices and/or the wireless devices may be configured to transmit RF spectrum requests indicating particular network usage requirements of the wireless devices to the spectrum manager. RF spectra assignment rules, received from enterprise administrators or based on network usage, are stores on the spectrum manager and executed thereby to allocate the RF spectrum to the requesting wireless devices. The RF spectra assignment rules assign portions of available RF spectra in the area to particular wireless devices. Based on the RF spectra assignment rules and the RF spectrum requests, the spectrum manager allocates portions of the RF spectra to the wireless devices and accordingly notifies the wireless devices of the assignments. The notified wireless devices may then tune to the frequency, band, channel, or other RF parameter of the so-allocated RF spectra. The various examples disclosed herein provide the ability to efficiently allocate licensed and unlicensed portions of available RF spectrum in an area, regardless of whether devices are cooperating with each other.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Examples disclosed herein generally relate to automated management of RF spectrum consumption within a geographic area by identifying available network licensed and unlicensed network resources in the area and intelligently allocating spectrum to wireless devices based on the network usage requirements of the devices. To do so, the spectrum manager monitors the RF spectra in a given area, identifying which portions are available for device consumption and which portions are currently being used. The spectrum manager receives the RF spectrum requests from the wireless devices, either directly or through intermediary network access devices (e.g., wireless access points, wireless controller, or other network management system). The RF spectrum requests indicate network usage requirements of cooperating and non-cooperating wireless devices in the area, such as, for example but with limitation, particular frequencies, bands, channels, utilization, network availability, or any other RF parameter. The RF spectrum requests may be communicated to the spectrum manager through network access devices providing connectivity to the wireless devices or directly from the wireless devices themselves. The spectrum manager analyzes the available spectra and received network usage requirements of the wireless devices and allocates spectra to the wireless devices based on RF spectra assignment rules, or in reaction to current network usage and/or interference.

Whether RF consumption needs of the devices are provided directly from the wireless devices or through network access devices, the spectrum manager, in some examples, assigns wireless devices in the area to particular RF spectra based on the requested data consumption needs of the devices and RF spectra availability. Specific devices (e.g., gaming consoles, servers, security cameras, etc.) may be assigned to particular RF frequencies, bands, channels, channel widths, transmission time durations, or the like in a predetermined setting set by an administrator, e.g., in a dedicated manner specifying that particular types of devices are to exclusively use a certain frequency band.

Alternatively or additionally, the spectrum manager may reactively assign or reassign devices to particular spectra based on the current network consumption across all or a subset of the available RF spectra in the area. For example, a wireless device (e.g., smart phone) scheduled to use a particular band and RF frequency may be switched to another band and RF frequency upon detection by the spectrum manager that the original band is busy (e.g., exceeds threshold amounts traffic) or some other condition. While discussed in more detail below, some of the conditions that may be used to reactively assign devices to wireless spectrum include, for example but without limitation, changes to the spectrum, detection that other devices are requesting the same spectrum, priority of device or application (e.g., video telecast devices may need faster, less-congested spectrum than messaging applications), or the like.

In some examples, the spectrum manager manages spectrum allocation across both licensed and the unlicensed spectra in a given area or for a particular enterprise. For example, Company ABC may have obtained a particular portion of licensed RF spectrum in a particular locality. Unlicensed spectra may also be available for use in that area as well. The spectrum manager, in some examples, identifies all available spectra that can be allocated—both licensed and unlicensed—and then assigns available spectrum to requesting devices, either in real time or prospectively for future use.

This disclosure frequently refers to cooperating and non-cooperating devices. Cooperating and non-cooperating wireless devices may be any type of wireless communicating device, such as, for example but without limitation, a smart phone, tablet, laptop, gaming console, server, virtual machine, television, projector, wearable device, industrial component, control circuitry, or the like.

Specifically, a "cooperating device" refers to a wireless device configured to coordinate its data consumption with another wireless device. Cooperating devices may communicate via an auxiliary control channel (e.g., a dedicated channel) within a locality, enabling the cooperating devices to organize their spectrum usage. For example, a cooperating gaming console may identify that a collection of servers in an area are scheduled to transmit data on a particular band in a frequency range. The gaming console, knowing the data consumption requirements and channel of the servers, may alternatively transmit across a different channel in an effort to eliminate the possibility of interference between the disparate devices.

A "non-cooperating device" refers to a wireless device that does not coordinate its data consumption with another wireless device. For example, a smart phone may not know the transmission channels or frequencies of networked televisions, and may therefore go ahead and transmit data across the same band or frequency.

In some examples, the presence of cooperating and/or non-cooperating devices in an area is detected upon transmission of network access requests from the devices themselves to a spectrum manager. These network access requests, in some examples, include network requirement information of the wireless devices. The spectrum manager uses received network access requests from the wireless devices to optimize the network consumption in a given area. More specifically, network access requests may include, for example but without limitation, an indication of RF bands, channels, channel widths, transmission time durations, device location (both current and predictive), current status, or other metric specific to wireless device data transmission. For example, a gaming console may request to access to 40 MHz of wireless spectrum in the 2.4/5.0 GHz range with at least 20% utilization either currently or at some predetermined timeframe in the future.

Figure 1:
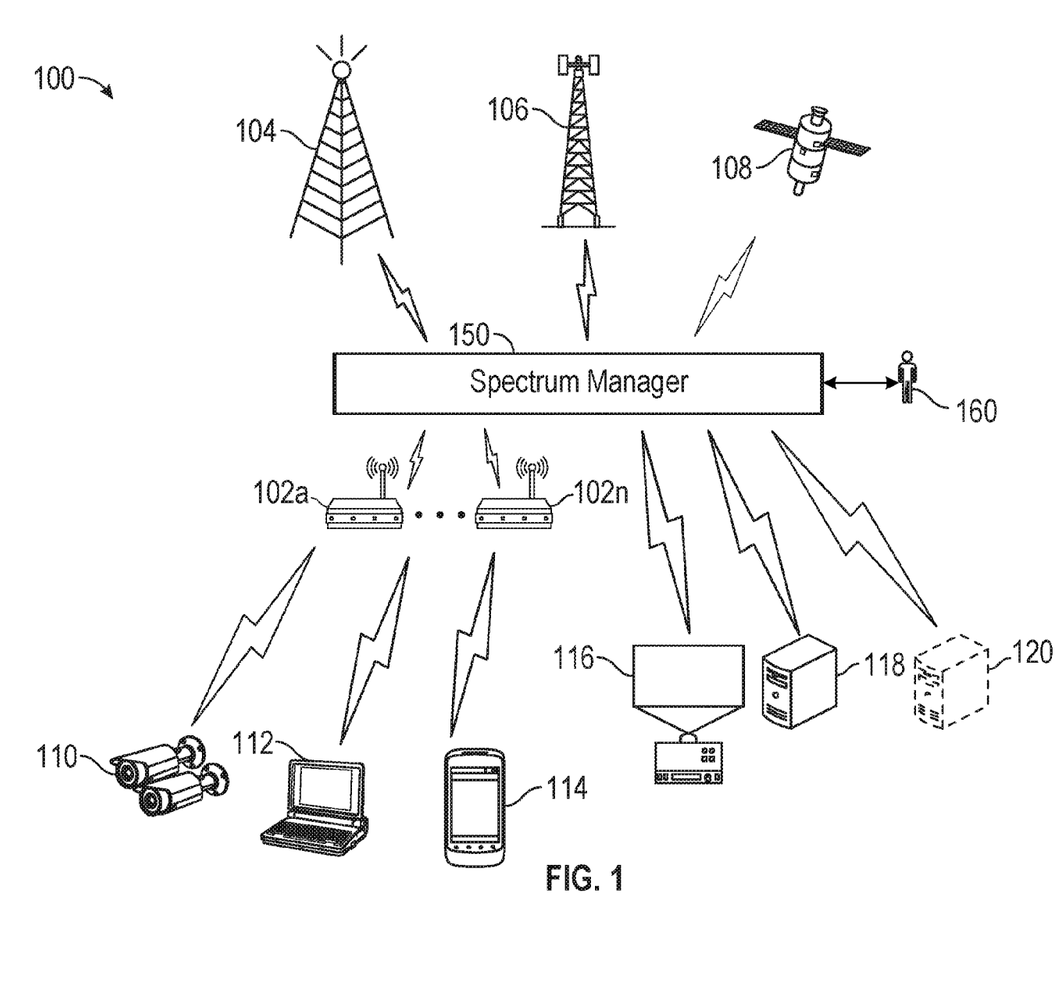
FIG. 1 is a block diagram of a wireless environment managed by a spectrum manager.

Having generally described at least some of the examples disclosed herein, attention is now drawn to the accompanying drawings for additional support. FIG. 1 illustrates a block diagram of a wireless environment 100. Wireless environment 100 includes a variety of sources providing RF signals, including, for example but without limitation, a radio tower 104, a base station tower 106, and a satellite 108. A spectrum manager 150 allocates RF spectrum in the area to a collection of wireless devices 110-120, either directly or through one or more network access devices 102a-102n.

Sources 104-108 are provided merely as examples of different sources of available RF spectrum sources in a particular location. More specifically, radio tower 104 may generate RF signals, including AM and FM radio signals. Base station 106 may be a cellular base station that generates cellular signals, e.g., Code Division Multiple Access (CDMA), Global System for Mobile Communications (GSM), 3G, 3G-long term evolution (3G-LTE), 4G, signals, or the like. Satellite 108 may include communication satellites or GPS satellites and may generate satellite radio, television, GPS, or other types of RF signals.

The various sources 104-108 may be assigned frequency bands, power limitations, or other restrictions, requirements, and/or licenses by a government spectrum control entity, such as the Federal Communications Commission (FCC), or otherwise remain unlicensed. Some of the examples disclosed herein provide enterprises the ability to operate, in essence, as their own RF-regulatory entity by managing the available licensed and unlicensed RF spectrum in an area in a manner that meets the RF demands of the area's devices.

Wireless devices 110-120 include security cameras 110, a laptop 112, a smart phone 114, a projector 116, a server 118, and a virtual machine 120. The depicted wireless devices 110-120 represent only a small fraction of the network devices in a given area. One skilled the art will understand that numerous additional and alternative devices may request and be assigned RF spectrum using the examples disclosed herein. Moreover, reference is made throughout this disclosure of "wireless" devices that are requesting wireless network access. Examples are not limited to providing RF spectrum only to wireless devices. Devices connected to a network access device or to spectrum manager 150 may also be assigned RF spectrum by the examples discussed herein. Therefore, the wireless devices disclosed herein include any wired devices attempting to gain network access.

The spectrum manager 150 detects the available RF spectrum generated from the various sources 104-108 in a given area. RF signaling and energy in the wireless environment 100 may be measured across a wide spectrum, and different available RF signals may be present for allocation by the spectrum manager 150 to wireless devices 110-120 that are also detected in the geographic area. In some examples, the spectrum manager 150 is configured to search and identify available frequencies, bands, channels, channel widths, transmission timeframes, or the like for use in the wireless environment 100 under certain conditions (e.g., day of week, time of day, power level, frequency band, frequency channel, utilization, congestion, times, location, etc.). In this manner, the entire available RF spectrum, including both licensed and unlicensed frequencies, are identified in the wireless environment 100, network access for the cooperating and non-cooperating wireless devices 110-120 in the locale is managed by the spectrum manager 150, and may be automatically detected by the spectrum manager 150 and/or manually specified by an administrator.

Wireless devices 110-120 are shown in FIG. 1 as security cameras 110, personal computers 114, smart phones 114, projectors 116, servers 118, and virtual machines 120 (represented as a dotted-outlined server). These devices may be cooperating or non-cooperating with each other. Also, the depicted wireless devices 110-120 represent only a small fraction of the wireless devices that may be managed by the spectrum manager examples disclosed herein. Virtually any wireless communicative device may be managed using the spectra-assignment components and techniques disclosed herein. Examples include, without limitation, wireless gaming controllers, computer peripherals (e.g., mice, keyboards), headphones, sensors (e.g., used in an Internet of Things (IOT) configuration), printers, copiers, fax machines, televisions, climate control devices, security devices, lighting, and any other device configured to communicate data using RF signals.

Network access devices 102a-n provide network connectivity to some of the wireless devices 110-114 in particular areas. Other devices 116-118 may interact directly with the spectrum manager 150 to receive spectra allocation, either through a cellular connection, radio link, point-to-point connection, or some other direct connection.

The spectrum manager 150 may be implemented as a standalone device, as a controller or processor embedded within another computing or networking device, as a virtual machine (VM) operating across multiple disparate devices, as a remote server in a cloud-based service, or in another processing configuration equipped to identify and allocate licensed and unlicensed spectra to wireless devices in a given area. In operation, the spectrum manager 150 enables an enterprise to identify and efficiently use all available licensed and unlicensed RF spectra available in a given area, thereby reducing network interference and communication degradation. Additionally, the spectrum manager 150's efficient allocation of network resources ensures that more wireless devices have access to available RF spectra when they need it and do not have to continually wait for licensed or unlicensed frequencies to clear.

An administrator 160 may control spectra assignments by providing the spectrum manager 150 with particular RF spectra assignment rules that specify how RF resources are to be assigned to the wireless devices 110-120. The administrator 160 may specify that particular types of devices, actual devices, or collections of devices may be assigned to specific RF resources, e.g., frequencies, channels, bands, utilization, etc. The administrator 160 may also specify the absolute, relative, conditional or reactive RF assignment rules discussed in more detail below.

Wireless devices 110-120 and/or sources 104-108 in a given geographic area may be manually identified to the spectrum manager 150 by an administrator 160. Alternatively, the devices 110-120 may be automatically detected by the spectrum manager 150 from RF spectrum requests received from the wireless devices 110-120 or their respective network access devices 102a-n. The spectrum manager 150 allocates RF spectrum to the devices based on their requested resource needs, the available spectra, and the RF assignment rules provided by the administrator 160 or an administrative device. Alternatively, the administrator 160 may resource need information for any of the devices 110-120—manually to the spectrum manager 150. The wireless devices 110-120 may be represented or otherwise indicated to the spectrum manager 150 according to media control (MAC) address, machine name (e.g., John's phone), Internet Protocol (IP) address (IP), username/password, user profile, device type (e.g., gaming console, virtual reality headset, etc.), or any other device indicator.

Again, the spectrum manager 150, in some examples, controls spectrum management for both cooperating and non-cooperating wireless devices. In this vein, cooperating and non-cooperating devices transmit requests indicating their network consumption needs to the spectrum manager 150, and the spectrum manager, having access to all available RF spectra in an area, allocates RF spectrum to the devices accordingly, or based on administrative conditions, business rules, or network availability. Knowing the requested network needs of the wireless devices enables the spectrum manager 150 to more efficiently allocate network resources to devices that would not normally coordinate network access efforts. For example, if projector 116 is non-cooperating with server 118, conventional environments that do not employ the spectrum manager 150 may allocate the same network resources to both devices if the two request the same RF access. Whereas, the disclosed examples provide a way to assign one of the devices to a different network RF frequency, channel, band, etc. that what one of the devices requested in order to reduce the chance of the two interfering with each other.

The spectrum manager 150 may obtain spectrum data over a wide range of wireless communication protocols (e.g., Transmission Control Protocol/Internet Protocol (TCP/IP) or the like). Additionally, the spectrum manager 150 may, in some examples, acquire data from and send data to database depositories that may be used by a plurality of spectrum managers 150 and/or wireless devices for spectrum allocation purposes. Such examples provide an extensible framework that allows the devices themselves to understand the current, future, and historic network traffic consumption across the entire RF network in a given area, and responsively tailor network-access requests based on such data. For example, if laptop 112 is set to request 20 MHz of spectrum in the 2.4 GHz frequency, the spectrum manager 150 may be configured, through administrator-set conditions or predetermined business rules, to allocate the requesting laptop 112—from a particular user or all personal computing devices in general—to the 5 GHz frequency on band 40 and at a consumption of 15 MHz. Thus, the spectrum manager 150 is flexible and may be configured to grant access to specific network demands of requesting wireless devices or identify RF spectrum for the devices based administrator conditions; business rules; or current, future, and historical network usage.

In some examples, the spectrum manager 150 manages spectrum information based on frequency, bandwidth, channels, utilization, signal power, time, modulation type, geolocation, classification, format, and location of signal propagation. More specifically, spectrum utilization may be indicated as an absolute percentage (e.g., 20% of channel 20), a relative percentage (e.g., 50% of the unused utilization on a given channel), a fractional percentage (e.g., ⅓ of channel 30), or as a conditional percentage (e.g., if the security cameras 110 are provided with 10% utilization on channel 5, then smart phones 114 are provided with 15% of the utilization on channel 5 or some other measure). The examples disclosed herein may similarly vary the other delineated network parameters in the same absolute, relative, or conditional ways, thereby ensuring that the spectrum manager 150 is a flexible device capable of dynamically managing the network demands across a whole collection of RF spectra.

In operation, the spectrum manager 150 detects the available licensed and unlicensed RF spectra in the given area, and assigns spectra to wireless devices in the area, either upon request, upon administrative assignment, upon business rules, in response to current or future network consumption, or a combination thereof. To illustrate the latter (i.e., examples that respond to current or future network consumption), in some examples, the spectrum manager 150 analyzes the network congestion on all (or a set) of the available RF spectrum and responsively assigns specific devices to specific spectra based on current, future, and/or historic network availability, reliability, speed, or other connectivity metric. For example, the servers 118 may be operating an enterprise's cloud-hosting business that needs to be reliable and not commingled with third party traffic; yet, that that does not necessarily provide the fastest network connection.

The spectrum manager 150 may allocate portions of available spectrum to the servers 118 that are licensed by the enterprise (i.e., reliable and secure) but that have more congestion than other portions of the licensed spectrum, because speed is not necessarily an important factor for such devices. In the same vein, projectors 116 that provide a simulcast or telepresence service may need faster connection speeds, prompting the spectrum manager 150 to allocate less congested portions of the available spectra.

In some examples, the spectrum manager 150 allocates devices 110-120 to available spectra according to administrative conditions, business rules, available wireless resources, and the network needs of the devices. An administrator 160, or administrative computing device, may upload various conditions and business rules dictating which devices are assigned to different portions of spectra. For example, non-enterprise-owned mobile tablets must be allocated to unlicensed frequency bands and channels. Security devices (e.g., networked security cameras 110) may be allocated to a particular portion of an enterprise's licensed spectra. Gaming devices may be given more allocation freedom and assigned to any available spectra—licensed or unlicensed—that can meet particular threshold gaming criteria (e.g., bandwidth, transmission speeds, utilization, congestion, etc.). These are but a few examples provided to aid the reader, and are not meant to be an exhaustive list. Virtually any combination of networking requirements and configurations may be contemplated by the spectrum manager 150 when assigning RF spectrum to wireless devices.

In some examples, the spectrum controller 150 acts as the centralized intelligence that makes decisions pertaining to spectrum usage planning, managing and coordinating spectrum resource usage of all—cooperating and non-cooperating—wireless devices 110-120 within a locality. To be clear, a "locality" or "area" refers to a physical geographic area where cooperating and non-cooperating wireless devices 110-120 reside or transmit RF signals. Locality may also include the cooperating and non-cooperating devices under an enterprise's control, even though such devices may not be within a particular geographic area. In this manner, locality also includes an "enterprise domain," referring to the particular cooperating and non-cooperating devices being managed by the enterprise.

Figure 2:
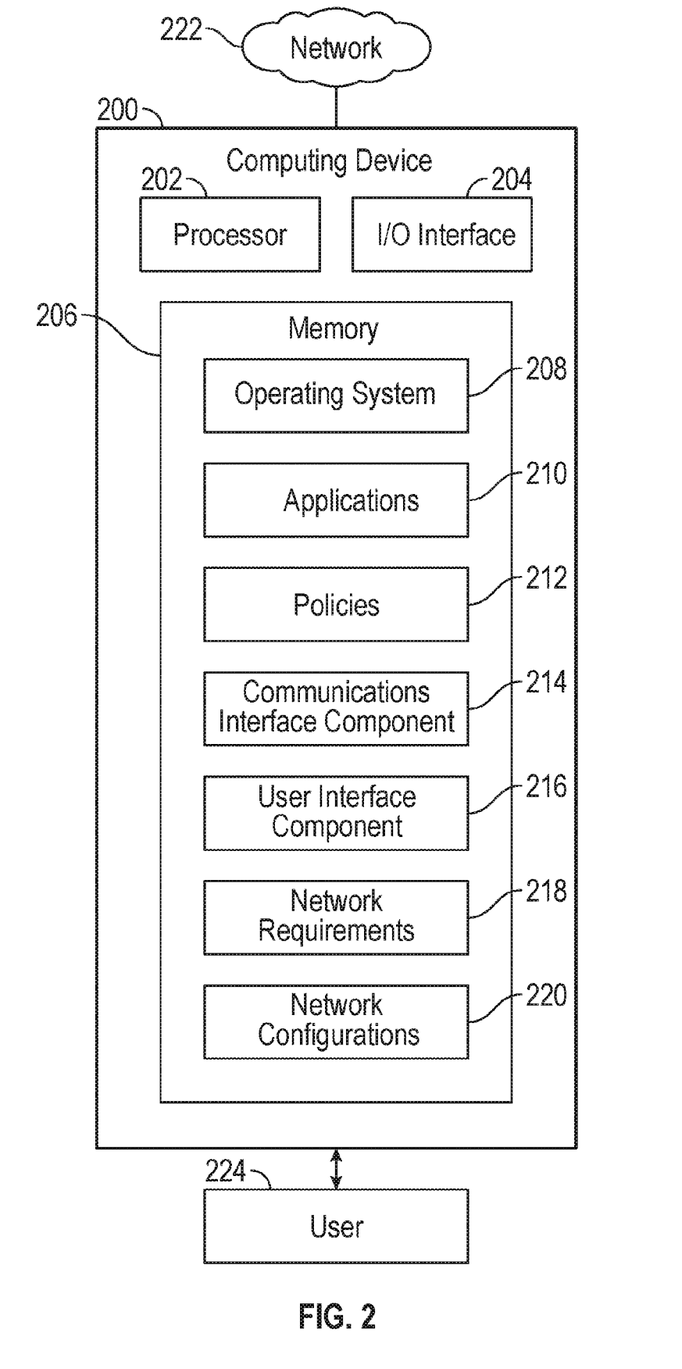
FIG. 2 is a block diagram illustrating an example of a wireless device configured to broadcast network resource needs to a spectrum manager.

FIG. 2 is a block diagram illustrating an example of a wireless device 200 configured to broadcast network resource needs to a spectrum manager 150. The mobile computing includes a processor 202, an input/output (I/O) interface 204, and a memory area 206. More specifically, the memory area 206 stores machine-executable instructions and data that may include an operating system 208, various applications 210, policies 212, a communications interface component 214, a user interface component 216, network requirements 218, and network configurations 220. The mobile computing device 100 may communicate across a public, private, or hybrid network 202. Any of the wireless devices 110-120, as well as the network access devices 102*a-n* when operating as intermediary devices, may take the form of wireless device 200. The depicted wireless device 200 is but one example of a suitable computing environment and is not intended to suggest any limitation as to the scope of use or functionality of the disclosed examples. Alternative or additional components may be used in other examples.

The wireless device 200 may take the form of a mobile computing device, a wearable device, a smart phone, a mobile tablet, a laptop, a personal computer, a virtual machine, a server, a security device, a networked television or projector, a peripheral device, an industrial device, a virtual reality device, a portable media player, an electronic sensor (e.g., for use in an IOT configuration), or any other type of electronic component accessible over the network 222. The wireless device 200 may also include less portable devices such as desktop personal computers, tabletop devices, industrial control devices, wireless charging stations, gaming consoles, servers, electric automobile charging stations, control systems, network access device (e.g., WLAN controller, WI-FI beacon, etc.), and the like. Additionally, the wireless device 100 may represent a group of processors 202 that are communicatively coupled but remotely located.

The processor 202 may include one or more processing units that are programmed to execute computer-executable instructions for implementing aspects of the disclosure. The instructions may be performed by the processor 202 or by multiple processors within the wireless device 200, or performed by a processor 102 external to the wireless device 200. In some examples, the operations illustrated in accompanying flow charts in FIGS. 4-5 may be implemented as software instructions encoded on a computer-readable medium, in hardware programmed or designed to perform the operations, or both.

Moreover, in some examples, the processor 202 represents an implementation of analog techniques to perform the operations described herein. For example, the operations may be performed by an analog computing device and/or a digital computing device, or the operations may be implemented by a system on a chip (SoC) or other circuitry (e.g., a plurality of interconnected, electrically conductive elements). Further still, the processor 202 may operate in a virtualized environment.

The I/O interface 204 may include a transceiver for wireless communication (e.g., WI-FI®, BLUETOOTH®, near-field communication (NFC), or other types of communication), an input port for wired (e.g., Ethernet, universal serial bus (USB)) connection, or the like. One skilled in the art will appreciate and understand that different wireless devices 200 include various I/O interfaces 204 and corresponding circuitry.

The memory area 206 includes any quantity of computer-storage media associated with or accessible by the wireless device 200. The memory area 206 may be internal to the wireless device 200 (as shown in FIG. 2), external to the wireless device 200 (not shown), or both (not shown). Examples of memory in the memory area 206 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and be accessed by the wireless device 200. Such memory may also take the form of volatile and/or nonvolatile memory; may be removable, non-removable, or a combination thereof; and may include various hardware devices (e.g., solid-state memory, hard drives, optical-disc drives, etc.). For the purposes of this disclosure, however, "computer storage media" does not include carrier waves or propagating signaling.

The operating system 208 is executed by the processor 202 and controls operational aspects of the wireless device 200. The applications 210, when executed by the processor 202, perform software or hardware functions on the wireless device 200. Examples of applications 224 include, without limitation, mail application programs, web browsers, text editors, spreadsheet programs, calendar application programs, gaming programs, address book application programs, messaging programs, security applications, banking applications, virtual-reality applications, telecast/telepresence applications, media applications, location-based services, search programs, mobile applications, and the like. The applications 210 may communicate with counterpart applications 210 or services on other wireless device 200, such as web services accessible via the network 222 or via a peer-to-peer connection.

In some examples, the wireless device 200 communicates over network 222. Examples of computer networks 222 include, without limitation, a wireless local area network (WLAN), a local area network (LAN), a wide area network (WAN), or the like. The network 222 may also comprise subsystems that transfer data between servers or wireless device 200. For example, the network 222 may also include a point-to-point connection, the Internet, an Ethernet, a backplane bus, an electrical bus, a neural network, or other internal system.

The memory area 208 may also be configured to store various device policies 212. These may include, for example but without limitation, control access levels to various processing or memory resources of the wireless device 200. Additionally or alternatively, the policies 212 may control or restrict the type of data communicated to or received by the wireless device 200 over the network 222. For example, restrictions on content, access to shared networked documents, and corporate access policies may all be implemented stored as policies 212.

In some examples, the communications interface component 214 includes a network interface card and/or computer-executable instructions (e.g., a driver) for operating a network interface card that provides access to the network 222. Communication between the computing device 200 and other devices over the network 222 may occur using any protocol or mechanism over any wired or wireless connection. In some examples, the communications interface is operable with short-range communication technologies such as by using near-field communication (NFC) tags, BLUETOOTH® brand communications tags, or the like. Examples of network transfer protocols include, for example but without limitation, the hypertext transfer protocol (HTTP), file transfer protocol (FTP), simple object access protocol (SOAP), or the like. Requests and responses may be passed as different markup language messages—e.g., extensible markup language (XML), hypertext markup language (HTML), or the like—or as parameters for scripting languages. One skilled in the art will appreciate that numerous scripting languages may be used by different distributed applications, a list of which, while not exhaustive, includes JAVASCRIPT® brand scripts, personal home page (PHP), or the like. Examples are not limited to any particular communication protocol, message language, or scripting language, as one skilled in the art will appreciate that different languages and protocols may be used to interact with distributed applications.

In some examples, the user interface component 216 includes a graphics card for displaying data to the user and receiving data from the user. The user interface component 216 may also include computer-executable instructions (e.g., a driver) for operating the graphics card. Further, the user interface component 216 may include a display (e.g., a touch screen display or natural user interface) and/or computer-executable instructions (e.g., a driver) for operating the display. The user interface component 216 may also include one or more of the following to provide data to the user or receive data from the user: speakers, a sound card, a camera, a microphone, a vibration motor, one or more accelerometers, joysticks, scanners, printers, a BLUETOOTH® brand communication module, global positioning system (GPS) hardware, and a photoreceptive light sensor. For example, the user may input commands or manipulate data by moving the computing device 200 in a particular way.

The network requirements 218 specify particular network usage requirements of the wireless device 200. These may include particular frequency levels, bands, bandwidths, transmission time lengths, modulation, code hopping, or other specifics about the RF signaling the wireless device 200 needs to for communication. The network requirements 218 may also indicate the use type of the device 200 (e.g., video transmission, audio streaming, text-based messaging, etc.), the location of the device 200 (historically, currently, or prospectively), the date and time of the requested network access (currently or prospectively), frequencies, bands, channels, spread spectrum parameters (e.g., channel width), intended utilization (e.g., data rates or throughput requirements), current utilization, traffic priority (e.g., Quality of Service (QoS) capabilities), vendor-specific information, and the like. Additionally or alternatively, network requirements 218 may include specific capabilities of the spectra detector 306, including, for example but without limitation: RF bands, channels, bandwidth, or modulations that are supported; device types or restrictions; protocols supported;

protocol parameters supported; and non-RF capabilities. Additionally or alternatively, network requirements 218 may include more general information, including, for example but without limitation: physical locations, owners, unique identifiers, friendly identifiers, previous allocation instructions from the spectrum manager 150, device types, peer spectrum manager identifiers (e.g., a wireless device may have been previously given instructions for a peer spectrum manager 150), and the like. Any combination of these requirements may be packaged into network requests submitted by the wireless device 200 to the spectrum manager 150.

Figure 3:
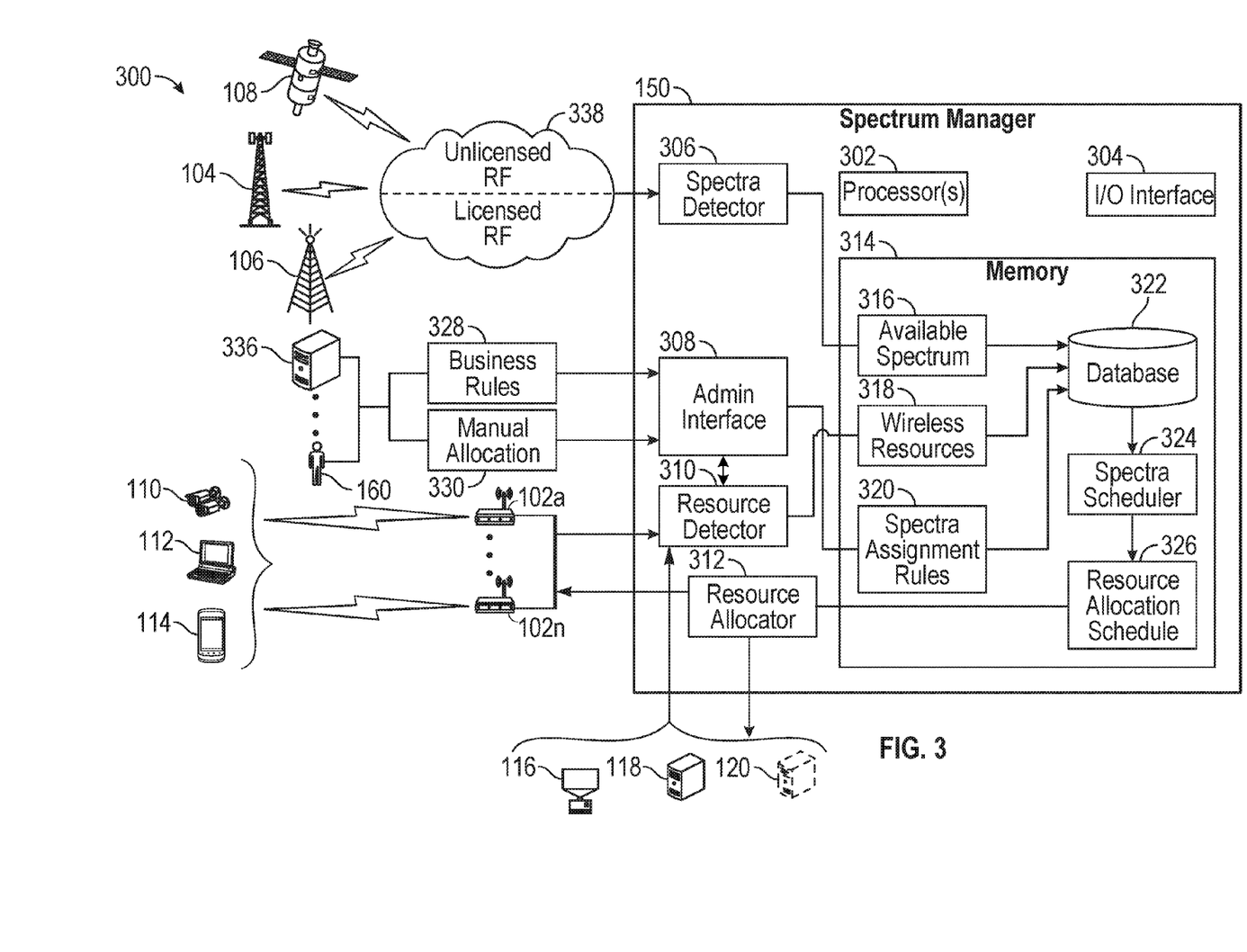
FIG. 3 is a block diagram of a spectrum manager configured to allocate spectrum to wireless devices.

The RF access requests from the wireless devices may indicate any of the aforesaid network requirements 218. For example, the RF access requests may also specify, for example but without limitation: RF bands, channels, bandwidth, modulation type, protocol, protocol parameters, usage type, date/time for using requested RF resources, utilization (e.g., absolute, conditional, relative, etc.), priority, status (e.g., whether the wireless device may be able to provide status on bands and channels it is using or not using), RF spectra utilization, RF interference, and the like. More specifically, in some examples, the wireless devices 110-120 include in the RF spectrum requests information pertaining to the state of the available RF resources to the resource detector 310 or the spectra detector 306. For example, an RF spectrum request may specify the current utilization of a particular channel or band in an RF spectrum request, indicating to the resource detector 310 network usage information detected by the wireless devices 110-120 themselves. This allows the wireless devices 110-120 to serve not only as requesters and consumers of the network resources but also monitors and network usage, in some examples.

In some examples, the wireless device 200 requests access to RF spectrum from the spectrum manager 150 by submitting a request with a collection of the network requirements 218 to the spectrum manager 150. As detailed more below in relation to FIG. 3, the spectrum manager 150 determines available RF spectrum for the wireless device 200—either through independent detection by the spectrum manager 150 or from network usage information provided by the wireless devices or network access devices 102*a-n*—to use based on the network requirements 218 submitted in the request from the wireless device, allocates a portion of RF spectrum to the wireless device 200, and transmits the allocated RF spectrum back to the wireless device 200. The parameters of the allocated RF spectrum are then stored and used as the network configurations 220 for tuning the transceiver to transmit data accordingly.

Alternatively, the network requirements 218 may not be communicated by the wireless device 200 directly to the spectrum manager 150. Instead, an administrator 160 may set the network device configurations for the wireless device 200 on the spectrum manager 150. For example, the administrator 160 may designate that all telepresence projectors are to use channel 40 at 5 GHz with a utilization of 30%, and that all smart phones are to use channels 5, 10, or 20 at 2.4 GHz frequency, and so on. Setting the network requirements beforehand enables an enterprise to control the RF spectrum for some of its more important devices.

FIG. 3 is a block diagram of a spectrum manager 150 configured to allocate RF spectrum to wireless devices 110-120. The spectrum manager includes one or more processors 302, an I/O interface 304, a spectra detector 306, an administrative interface (admin interface) 308, a resource detector 310, a resource allocator 312, and a memory area 314. The depicted spectrum manager 150 is but one example of a suitable computing environment and is not intended to suggest any limitation as to the scope of use or functionality of the disclosed examples. Alternative or additional components may be used in other examples.

The I/O interface 304 may include a transceiver or hard-wired connection and may operate at a predetermined dedicated channel, such that all cooperating and non-cooperating wireless devices 200 are programmed to or learn to communicate at that channel. New cooperating and non-cooperating wireless devices 200 coming into the geographic reach of the spectrum manager 150 may then communicate with the spectrum manager 150 through the I/O interface 304. The I/O interface 304 may be capable of multiple dedicated channels, allowing cooperating and non-cooperating wireless devices 200 to attempt communication across all dedicated channels until a connection is made. That way, if any RF interference affects the quality of any of the communication channels with the spectrum manager, a different channel may be used. An ad-hoc multi-hop network may form the backbone communication of the channel, and a simple communication protocol for low transceiver complexity may be used to reduce the amount of traffic generated through communications between the wireless devices 200 and the spectrum manager 150.

The spectra detector 306, admin interface 308, resource detector 310, and resource allocator 312 may be implemented in hardware, circuitry, software, firmware, or a combination thereof. In operation, the spectra detector 306 detects the available RF spectrum 338 in a given area. As shown, the detected RF spectrum 338 may include both unlicensed RF and licensed RF that are available for use in a given geographic location. For example, an enterprise (such as business) may have licensed a particular spectrum for use within a given locale, and unlicensed bands may also be readily available in the area as well. The spectra detector 306 may detect both. Moreover, the spectra detector 306 stores the detected available spectrum 316 in the memory area 314.

The admin interface 308 is a front-end interface that receives business rules 328 and manual spectra allocations 330 from an administrator 160 or an administrative device 336. Collectively, the business rules 328 and the manual spectra allocations 330 are referred to as "RF spectra assignment rules." In some examples the admin interface 308 is a user interface (UI) that the administrator 160 may manually enter the business rules 328 or manual allocations 330. In other examples, the admin interface 308 is an API access point that allows the administrator 160 or administrative device 336 to send the business rules 328 or manual allocations 330. In still other examples, the admin interface is combination of both APIs and UIs.

The received business rules 328 and manual spectra allocations 330 are stored in the memory area 314. More specifically, the admin interface 308 may a UI for a user to selectively assign spectra to individual cooperating and non-cooperating devices 200 in an area, or collectively allocate spectra to different types of devices 200. For example, the administrator 160 may reserve a portion of spectra (e.g., 40 MHz of the 2.4 GHz with 30% utilization on bands 20, 30, or 35) to a company's servers that are hosting a particular massively multiplayer online role-playing game (MMORPG), and the administrator 160 may also designate that all WI-FI® connected smart phones be allocated to unlicensed spectra in the 5 GHz range.

The business rules 328 include RF spectra assignment rules that designate absolute, relative, or conditional rules for assigning spectra. These RF spectra assignment rules may be absolute, relative, conditional, or reactive. Absolute rules may include general assignments for all devices in a particular group or specific devices themselves, e.g., if a Company ABC tablet, then allocate at least 5% of a particular licensed frequency on band XX. Relative rules may include assignments based on other devices in the area. For example, if 20% of a particular frequency is available and other devices of particular types (e.g., virtual machine servers running certain cloud-computing services) have already been assigned spectra, then allocate at least 10% of a particular unlicensed frequency on band YY. Conditional rules may include assignments based on the current or future usage of available licensed and unlicensed spectra. For example, such conditional rules may specify that if the particular frequencies in the licensed frequency range are scheduled to be allocated for a certain group of devices 200 (e.g., gaming consoles) but the devices 200 are not currently using more than a threshold amount of the allocated spectra, then some of the unused, allocated spectra may be reassigned to other devices 200 in the area. This allows unused spectra to be quickly identified and reassigned on an as-needed basis in order to maximize overall network usage. Reactive rules may include reassignment conditions for allocating spectra based on the interference or degradation detected across particular RF resources, allowing the spectrum manager 150 to quickly reassign wireless devices 110-120 to clearer RF frequencies, channels, bands, etc.

Additionally or alternatively, the business rules 328 may also take into account or consider the user type of particular devices 200. Devices 200 that have historically used, or are currently or prospectively requesting, more data than others may be allocated uncongested frequency, bands, or utilization ratios of RF spectrum. Particular RF spectrum may be reserved at different times and dates (e.g., during historically high traffic times/dates) for devices 200 needing faster transfer speeds. For example, telepresence applications that require fast transfer speeds to stream video conferencing may be allocated particular portions of licensed spectrum during peak telepresence hours (e.g., from 10:00 am until 4:00 pm Monday through Friday on non-holiday days).

Additionally or alternatively, the business rules 328 may consider the usage requirements of other wireless devices 200, either currently, historically, or prospectively. For example, if a large amount of traffic is scheduled to use a particular frequency band at a certain time, devices 200 requesting to use that band may be re-assigned to less congested licensed or unlicensed frequencies, bands, or the like. In this manner, the spectrum manager 150, in some examples, allocates network traffic to unused network resources while still being able to handle inevitable traffic. Such traffic reassignment may be scheduled for particular timeframes to allow traffic surges to dissipate before the devices 200 are migrated back to the originally requested frequencies, bands, or the like. Or such reassignment may be kept in place until surges are detected to dissipate to particular normal levels.

As depicted, some of the wireless devices 110-114 in an area may communicate RF spectrum requests to the resource detector 310 of the spectrum manager 150 through intermediary network access devices 102a-n. The network access devices 102a-n, in turn, individually relay or aggregate and relay the network requirements of the respectively managed wireless devices requesting network access in a given area. Additionally or alternatively, other wireless devices 116-120 may be configured to directly communicate RF spectrum requests to the resource detector 310 of the spectrum manager 150. Thus, the resource detector 310 detects all the cooperating and non-cooperating wireless devices 110-120 in the geographic area, either directly (as shown by wireless devices 116-120) or through intermediary network access devices 102a-n (as shown by wireless devices 110-114).

Alternatively, the network requirements of the wireless devices 110-120 may be preset by the administrator 160 or an administrative device 336, through the admin interface 308. For example, the administrator 160 may specify that the projector 116 is always to be assigned to a licensed portion of RF spectrum or to particular RF bands that have a certain amount of free bandwidth. In this manner, the administrator 160 may control spectra allocation of any of an enterprise's devices in the area.

The network resources in the RF spectra requests of the wireless devices 110-120 are stored in the memory 314 of the spectrum manager 150 as wireless resources 318, thereby indicating in real time the various devices needing network access in an area. Capturing all the RF spectra requests of the wireless device 110-120—either directly or through network access devices 102a-n—ensures the spectrum manager 150 intelligently allocates RF spectra to devices that conventionally do not cooperate with each other.

Along with the detected wireless resources 318, the available spectrum 316 identified by the spectra detector 306 or learned through parameters designated in the RF spectra requests and the spectra assignments rules 320 (which include the business rules 328 and/or the manual allocations 330 received through the admin interface 308) are stored in a database 322 in the memory area 314. The spectra scheduler 324 generates a resource allocation schedule 326 specifying spectra assignments for devices 110-120, and then provides the resource allocation schedule 326 to the resource allocator 312 for actual device 110-120 RF assignments. In turn, the resource allocator 312 provides spectrum allocation assignments to the various wireless devices 110-120 in the given area that allow the devices 110-120 to tune themselves accordingly.

Figure 4:
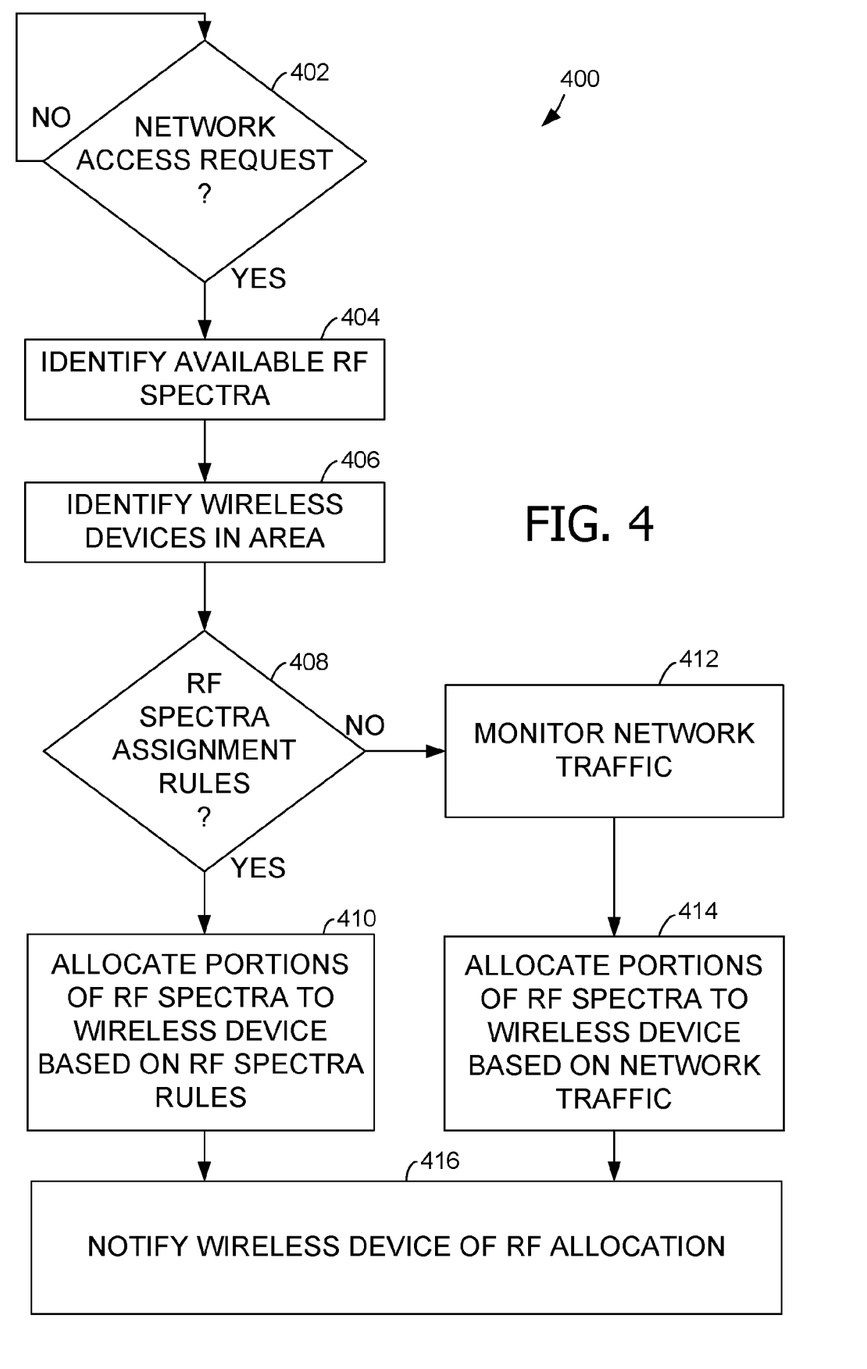
FIGS. 4-5 are flow chart diagrams illustrating work flows for implementing effective spectrum allocation.

FIG. 4 is a flow chart diagram illustrating a work flow 400 for implementing effective spectrum allocation. Work flow 400 begins with a spectrum manager 150 waiting to receive network access requests from wireless devices in a particular geographic area, as shown at decision box 402. The wireless devices may be cooperating or non-cooperating devices 200, and may be configured to broadcast their respective network requirements 222 to the spectrum manager 150 or to the network access devices 102a-n, which in turn so-broadcast to the spectrum manager 150. In some examples, the spectrum manager 150 routinely, continually, periodically, or otherwise waits for network access requests from the wireless devices 200 in the area, as indicated by the NO path from decision box 402. The spectrum manager 150 identifies available RF spectra in the area and other connected wireless devices 200 that currently have access to or have been scheduled for prospective to the available RF spectra in the area, as shown by boxes 404 and 406, respectively.

Once the available RF spectra and other wireless devices 200 are identified, the spectrum manager searches internally for RF spectra assignment rules submitted through an admin interface 308, as shown at decision box 408. The RF spectra assignment rules may indicate absolute, conditional, and/or relative rules for assigning wireless devices to different portions of RF spectrum. For example, rules may indicate that all company telepresence devices are to be assigned to particular licensed frequencies and at particular utilization ratios. If no RF spectra assignment rules relevant to the wireless device 200 submitting the network access request exist, the NO path is followed whereby the network traffic across portions or the entire available RF spectra are monitored for RF spectrum that will serve the network requirements 218 of the wireless device 200, as shown at box 412.

Based on either the RF spectra assignment rules (if any) or the identified RF spectrum that fits the needs of the requesting wireless device, a portion of the available RF spectra is allocated for the wireless device 200, as shown at boxes 410 and 414. The spectrum manager 150 then notifies the requesting wireless device 200 of its allocated RF spectra, which allows the wireless device 200 to tune itself accordingly for data transmission.

Figure 5:
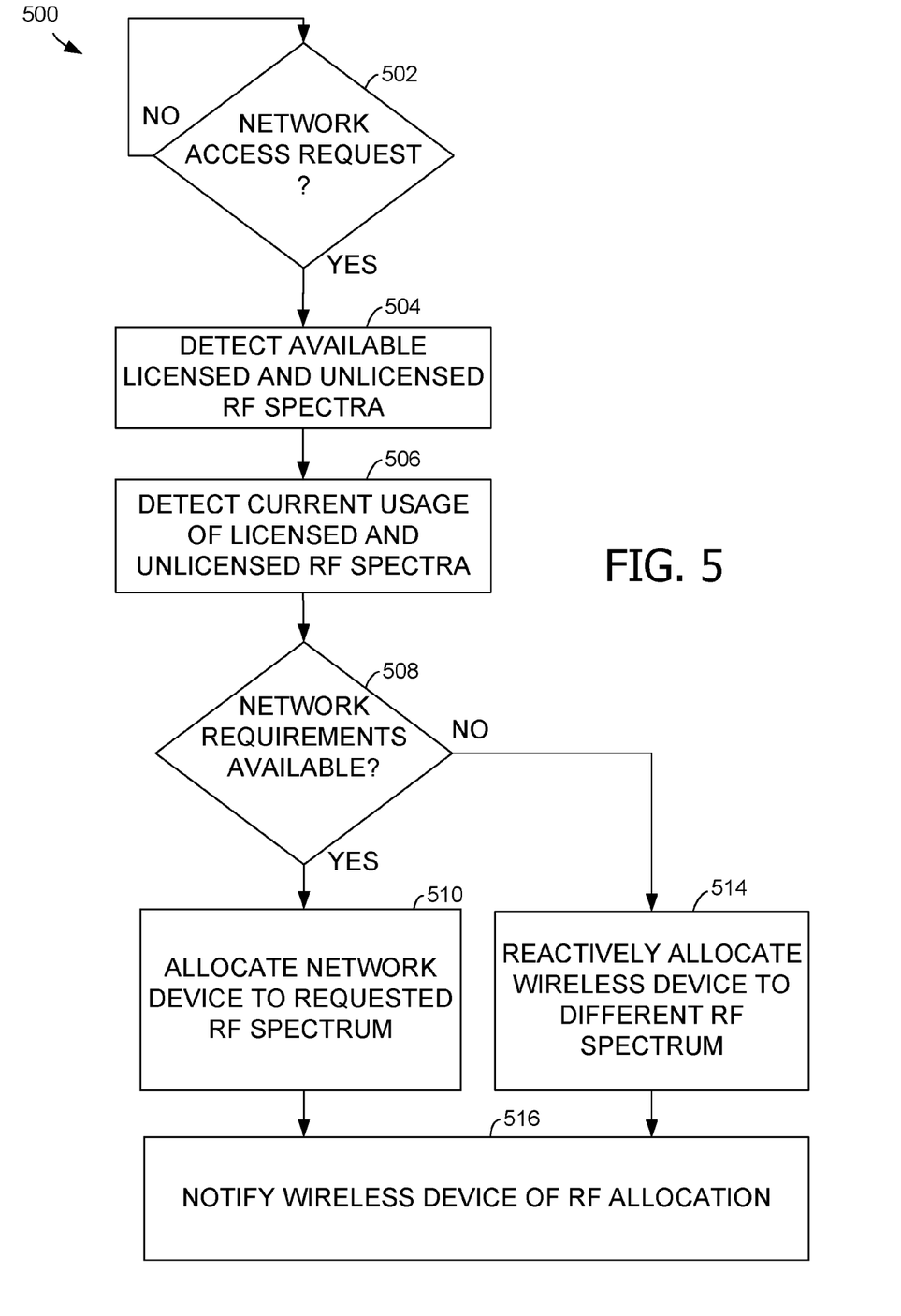

FIG. 5 is a flow chart diagram illustrating a work flow 500 for implementing effective spectrum allocation. Work flow 500 initially begins with a spectrum manager 150 waiting to receive network access requests from cooperating or non-cooperating wireless devices 200 in a particular geographic area, as shown at decision box 502. In some examples, the network access requests include designated network requirements 222 that include frequencies, bands, channels, timeframes, utilization rations (e.g., 30% utilization), or a combination thereof being requested by requesting wireless device 200. The wireless devices 200 broadcast their respective network requirements 222 to the spectrum manager 150. In some examples, the spectrum manager 150 routinely, continually, periodically, or otherwise waits for network access requests from the wireless devices 200 in the area, as indicated by the NO path from decision box 502.

As shown at box 504, the spectrum manager 150 identifies available licensed and unlicensed RF spectra in the area. As shown at box 506, the spectrum manager also detects the network usage of such licensed and unlicensed RF spectra. The spectrum manager 150 decides whether the requested network requirements 222 in the network access request are available for allocation to the requesting wireless device 200, as shown by decision box 508. If so, the spectrum manager 150 allocates the requested RF spectrum to the requesting wireless device 200, as shown at box 510. If not, the spectrum manager 150 reactively allocates different RF spectrum to the requesting wireless device 200, as shown at box 514. The spectrum manager 150 notifies the requesting wireless device 200 of the allocated RF spectrum to use, so that the requesting wireless device 200 can tune itself accordingly.

The network requirements 222 in the network access request, in some examples, indicate particular RF spectrum that is being requested to be used by the requesting wireless device 200. For example, the network access request may specify that the requesting wireless device wants to use 40 MHz of the 2.4 GHz frequency on channels 30 or 40 with a utilization of at least 20%. The spectrum manager 150 checks to see whether the requested network requirements 222 are available for the requesting wireless device, as shown at decision box 508.

Additional Examples

Some examples are directed to a spectrum manager for allocating radio frequency (RF) spectra comprising licensed and unlicensed frequencies to wireless devices. The spectrum manager includes memory for storing a designation of RF spectra assignment rules for assigning portions of the RF spectra to wireless devices in an area. The spectrum manager also includes one or more processors programmed for: receiving RF spectrum requests from the wireless devices in the area, the RF spectrum requests indicating network usage requirements of the wireless devices, identifying the RF spectra available in the area, the RF spectra comprising at least one licensed frequency or at least one unlicensed frequency, applying the RF spectra assignment rules to schedule an allocation of portions of the RF spectra to the wireless devices based on the RF spectrum requests, and notifying the wireless devices of the allocation of the portions of the RF spectra to enable the wireless devices to efficiently use the portions of the RF spectra.

Some examples are directed to allocating RF spectrum to wireless devices in an area by performing the following operations. Available licensed and unlicensed RF spectra are detected in an area. Current network usage is detected across a plurality of licensed and unlicensed frequencies in the RF spectra. Requests for network access are received from wireless devices in the area. RF assignment rules designating conditions for assigning the wireless devices to portions of the licensed and unlicensed RF spectra are accessed, and the wireless devices are allocated to the unlicensed RF spectra in accordance with the RF assignment rules. A spectrum manager directs the wireless devices to use the respectively assigned portions of the licensed and unlicensed RF spectra in accordance with the RF assignment rules, thereby enabling efficient usage of the licensed and unlicensed RF spectra.

Some examples are directed to computer-storage memory, which does not include carrier waves or propagating signaling, embodied with machine-executable instructions for allocating RF spectra to wireless devices in a given area. The instructions are operable for: detecting current network usage across a plurality of licensed and unlicensed frequencies in the RF spectra; receiving requests for network access from non-cooperating wireless devices in the area, the requests requesting access to particular frequencies, bands, or channels of the RF spectra; reactively assigning the non-cooperating wireless devices to different RF spectra portions than indicate in the requests based on the current network usage; and directing the non-cooperating to use respectively the different RF spectra portions to for network access.

Alternatively or in addition to the other examples described herein, some examples include any combination of the following:
  RF spectra assignment rules that are received from an administrative device configured to automatically generate the RF assignment rules without user interaction;
  an administrative device configured to generate the RF assignment rules based on current network traffic demands detected on the at least one licensed frequency and the at least one unlicensed frequency;
  a spectra detector for detecting the at least one licensed frequency and at least one unlicensed frequency;
  a resource detector for detecting presence of the wireless devices in the area; an admin interface configured for presenting a user interface to an administrator, the user interface enabling entry of the RF assignment rules;
  assignment rules that designate particular types of the wireless devices are to be assigned to dedicated portions of the at least one licensed frequency;
  RF assignment rules that include relative rules for assigning spectra based on the network usage of the wireless devices;
  RF assignment rules that include conditional rules for assigning spectra based on the network usage of the at least one licensed frequency and the at least one unlicensed frequency;

wireless devices that include at least two non-cooperating devices;
wireless devices that include cooperating devices;
notifying at least one of the wireless devices of an allocated frequency, frequency band, band width, or transmission time;
different RF spectra portions that include at least one different frequency than indicated in the requests from the non-cooperating devices;
different RF spectra portions that include at least one different band or channel than indicated in the requests from the non-cooperating devices; and
requests that include at least one request from a non-cooperating device prospectively requesting future network access.

While the aspects of the disclosure have been described in terms of various examples with their associated operations, a person skilled in the art would appreciate that a combination of operations from any number of different examples is also within scope of the aspects of the disclosure.

Exemplary Operating Environment

Although described in connection with an exemplary computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

The examples illustrated and described herein, as well as examples not specifically described herein but within the scope of aspects of the disclosure, constitute exemplary means for allocating licensed and unlicensed RF spectra to both coordinating and non-coordinating wireless devices. For example, the elements described in FIG. 3, such as when encoded to perform the operations illustrated in FIGS. 4-5, constitute exemplary means for identifying available RF spectra and allocating wireless devices in a given area to use the available RF spectra.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An apparatus for allocating radio frequency (RF) spectra comprising licensed and unlicensed frequencies to wireless devices, the apparatus comprising:
   memory for storing a designation of RF spectra assignment rules for assigning portions of the RF spectra to wireless devices in an area; and
   one or more processors programmed for:
      receiving RF spectrum requests from the wireless devices in the area, the RF spectrum requests indicating network usage requirements of the wireless devices, the network usage requirements specifying target spectrum utilization at predetermined timeframes, identifying the RF spectra available in the area during the predetermined timeframes, the RF spectra comprising at least one licensed frequency and at least one unlicensed frequency, applying the RF spectra assignment rules to schedule an allocation of portions of the RF spectra to the wireless devices with the target utilization and during the predetermined timeframes based, at least in part, on the RF spectrum requests of the wireless devices, and notifying the wireless devices of the allocation of the portions of the RF spectra during the predetermined timeframes to enable the wireless devices to efficiently use the portions of the RF spectra.

2. The apparatus of claim 1, wherein the RF spectra assignment rules are received from an administrator.

3. The apparatus of claim 1, wherein the RF spectra assignment rules are received from an administrative device configured to automatically generate the RF assignment rules without user interaction.

4. The apparatus of claim 3, wherein the administrative device is configured to generate the RF assignment rules based on current network traffic demands detected on the at least one licensed frequency and the at least one unlicensed frequency.

5. The apparatus of claim 1, further comprising:
a spectra detector for detecting the at least one licensed frequency and at least one unlicensed frequency; and
a resource detector for detecting presence of the wireless devices in the area.

6. The apparatus of claim 1, wherein the devices comprise at least two of a personal computer, a mobile tablet, a server, a virtual machine, a gaming console, a projector, a television, or a security camera.

7. The apparatus of claim 1, further comprising an admin interface configured for presenting a user interface to an administrator, the user interface enabling entry of the RF assignment rules.

8. The apparatus of claim 1, further comprising an admin interface configured that includes an application programming interface for providing the RF assignment rules.

9. The apparatus of claim 1, wherein the RF assignment rules designate that particular types of the wireless devices are to be assigned to dedicated portions of the at least one licensed frequency.

10. The apparatus of claim 1, wherein the RF assignment rules comprise relative rules for assigning spectra based on the network usage of the wireless devices.

11. The apparatus of claim 1, wherein the RF assignment rules comprise conditional rules associated with the specified target spectrum utilization for assigning spectra during the predetermined timeframe based on the network usage of the at least one licensed frequency and the at least one unlicensed frequency.

12. The apparatus of claim 1, wherein the wireless devices comprise at least two non-cooperating devices.

13. A method for allocating RF spectrum to wireless devices in an area, the method comprising:

receiving RF spectrum requests from the wireless devices in the area, the RF spectrum requests indicating network usage requirements of the wireless devices, the network usage requirements specifying target spectrum utilization at predetermined timeframes;

identifying the RF spectra available in the area during the predetermined timeframes, the RF spectra comprising at least one licensed frequency and at least one unlicensed frequency;

applying the RF spectra assignment rules to schedule an allocation of portions of the RF spectra to the wireless devices with the target utilization and during the predetermined timeframes based, at least in part, on the RF spectrum requests of the wireless devices; and notifying the wireless devices of the allocation of the portions of the RF spectra during the predetermined timeframes to enable the wireless devices to efficiently use the portions of the RF spectra.

14. The method of claim 13, wherein the target spectrum utilization comprises a percentage of an RF frequency band.

15. The method of claim 13, wherein the RF spectra assignment rules are received from an administrative device configured to automatically generate the RF assignment rules without user interaction.

16. The method of claim 15, wherein the administrative device is configured to generate the RF assignment rules based on current network traffic demands detected on the at least one licensed frequency and the at least one unlicensed frequency.

17. The method of claim 13, further comprising:
detecting the at least one licensed frequency and at least one unlicensed frequency; and
detecting presence of the wireless devices in the area.

18. The method of claim 13, wherein the devices comprise at least two of a personal computer, a mobile tablet, a server, a virtual machine, a gaming console, a projector, a television, or a security camera.

19. One or more computer-storage memory embodied with machine-executable instructions for allocating RF spectra to wireless devices in a given area, the memory executable by one or more processors to perform steps comprising:

receiving RF spectrum requests from the wireless devices in the area, the RF spectrum requests indicating network usage requirements of the wireless devices, the network usage requirements specifying target spectrum utilization at predetermined timeframes, applying the RF spectra assignment rules to schedule an allocation of portions of the RF spectra to the wireless devices with the target utilization and during the predetermined timeframes based, at least in part, on the RF spectrum requests of the wireless devices, and notifying the wireless devices of the allocation of the portions of the RF spectra during the predetermined timeframes to enable the wireless devices to efficiently use the portions of the RF spectra.

20. The memory of claim 19, wherein said spectrum utilization comprises a threshold percentage of an RF channel.

* * * * *